(12) United States Patent
Ahsanullah

(10) Patent No.: US 9,583,974 B1
(45) Date of Patent: Feb. 28, 2017

(54) UNINTERRUPTIBLE POWER SUPPLY FOR AN ELECTRIC APPARATUS

(71) Applicant: Asif Ahsanullah, Murphy, TX (US)

(72) Inventor: Asif Ahsanullah, Murphy, TX (US)

( * ) Notice: Subject to any disclaimer, the term of this patent is extended or adjusted under 35 U.S.C. 154(b) by 652 days.

(21) Appl. No.: 14/088,686

(22) Filed: Nov. 25, 2013

(51) Int. Cl.
*H02J 9/04* (2006.01)

(52) U.S. Cl.
CPC ........................... *H02J 9/04* (2013.01)

(58) Field of Classification Search
CPC ............... H02J 9/04; H02J 9/06; G06F 3/038
See application file for complete search history.

(56) References Cited

U.S. PATENT DOCUMENTS

| | | | | |
|---|---|---|---|---|
| 4,907,183 A | * | 3/1990 | Tanaka | G06F 1/30 365/229 |
| 5,859,499 A | * | 1/1999 | McAfee | H02J 9/06 307/128 |
| 2009/0021078 A1 | * | 1/2009 | Corhodzic | G06F 1/263 307/67 |
| 2010/0177070 A1 | * | 7/2010 | Zhu | G06F 1/3203 345/205 |

* cited by examiner

*Primary Examiner* — Jared Fureman
*Assistant Examiner* — Rafael Pacheco
(74) *Attorney, Agent, or Firm* — Michael Diaz

(57) ABSTRACT

An uninterruptible power supply system for supplying electrical power to an electrical apparatus. The system includes an alternating current (AC) power source providing AC power and a direct current (DC) power source providing DC power. The system also includes a power selector system having a power selector for selecting AC power or DC power for powering the electrical apparatus. The power selector system has a sensor for determining if AC power is acceptable for powering the electrical apparatus. In addition, the system includes a power automation system for charging the DC power source and a power management module for controlling the power selector system and the power automation system. The power management module switches to DC power for powering the electrical apparatus when the AC power is unacceptable. When DC power is used, DC power is provided directly to the electrical apparatus without converting the DC power.

17 Claims, 5 Drawing Sheets

UNINTERRUPTIBLE POWER SUPPLY FOR AN ELECTRIC APPARATUS

BACKGROUND OF THE INVENTION

Field of the Invention

This invention relates to power supplies. Specifically, and not by way of limitation, the present invention relates to an uninterruptible power supply for an electric apparatus.

Description of the Related Art

An uninterruptible power supply (UPS) or uninterruptible power source is an electrical device which provides emergency power to a load for an electrical apparatus when the primary input power source, typically AC main power fails. A UPS differs from a standby generator or an auxiliary power system in that the UPS provides near-instantaneous protection from input power interruptions, by supplying energy stored in batteries to the load. The battery runtime for most uninterruptible power sources is relatively short, e.g., a few minutes, but is sufficiently long to start a standby power source or properly shut down the protected electrical apparatus.

A UPS unit is typically used to protect electrical hardware such as computers, data centers, or other electrical equipment where an unexpected power disruption could cause injuries, fatalities, serious business disruption or data loss. UPS units range in size from units designed to protect a single computer without a video monitor to large units powering entire data centers or buildings.

FIG. 1 is a simplified block diagram of an existing UPS unit 10 providing alternating current (AC) power normally to an electrical apparatus. In its most simplified form, the existing UPS unit 10 typically includes an AC electrical source 12, such as from a typically main electrical system of a building or home. The AC electrical source 12, under normal circumstances, provides power to an electrical apparatus 14. The UPS unit also includes a charger 16, a battery 18, and an inverter 20. In addition, the UPS unit 10 includes an inverter switch 22 and a main power switch 24. As depicted in FIG. 1, the charger, battery and inverter are disconnected from the electrical apparatus 14. The battery 18 receives power through the charger 16 from the AC electrical source 12.

FIG. 2 is a simplified block diagram of the existing UPS unit 10 of FIG. 1 during a power loss or disruption of acceptable power to the electrical apparatus 14. When the incoming voltage from the AC electrical source 12 falls below or rises above a predetermined level, the UPS unit 10 turns on its internal DC-AC inverter circuitry 30, which is powered from the battery 18. This provides high or low voltage protection to the electrical apparatus. The UPS unit 10 then switches power to the DC-AC inverter circuitry 30 by moving the switches 22 and 24 to use the battery to power the electrical apparatus. As the battery using direct current (DC) power, the power is converted to AC power through the use of the inverter 20. The objective of the UPS is to power electrical equipment, such as a personal computer, without any objectionable dip or brownout to that device.

Although the UPS unit 10 depicted in FIGS. 1 and 2 are useful, existing UPS units suffer from several drawbacks caused by using an inverter. The traditional UPS unit uses a low voltage DC supply converted into high voltage AC power through a core step-up transformer augmented with an oscillator to manage waveform in hertz. With the requirement of converting DC power to AC power for the electrical apparatus 14, the UPS unit 10 typically creates a large footprint to accommodate the use of an inverter. Additionally, excess amounts of heat are generated by converting the DC power to AC power. This increase in heat is a severe problem which requires additional cooling devices and design configurations to reduce the heat signature of the UPS unit 10. In addition, the inverter provides a "step up" in power, which further contributes to the complexity and cost of the UPS unit. Furthermore, the existing UPS requires a high capacity inverter and complex circuitry with AC/DC and vice versa conversion requirements.

It would be advantageous to have a UPS unit which provides simple and efficient power switchover from the AC electrical source to a battery without the complexity and inherent problems associated with existing UPS units. It is an object of the present invention to provide such an apparatus.

SUMMARY OF THE INVENTION

In one aspect, the present invention is directed to an uninterruptible power supply system for supplying electrical power to an electrical apparatus. The system includes an alternating current (AC) power source providing AC power and a direct current (DC) power source providing DC power. The system also includes a power selector system having a power selector for selecting AC power or DC power for powering the electrical apparatus. The power selector system has a sensor for determining if AC power is acceptable for powering the electrical apparatus. In addition, the system includes a power automation system for charging the DC power source and a power management module for controlling the power selector system and the power automation system. The power management module switches to DC power for powering the electrical apparatus when the AC power is unacceptable. When DC power is used, DC power is provided directly to the electrical apparatus without converting the DC power.

In another aspect, the present invention is directed to a method of providing uninterruptible power to an electrical apparatus. The method includes the steps of providing AC power from an AC power source to the electrical apparatus and monitoring the AC power to determine if the AC power is acceptable for powering the electrical apparatus. If it is determined that the AC power is unacceptable, the AC power is switched to DC power to power the electrical apparatus. The DC power is directly fed to the electrical apparatus without converting the DC power to AC power.

DESCRIPTION OF THE INVENTION

Figure 1:
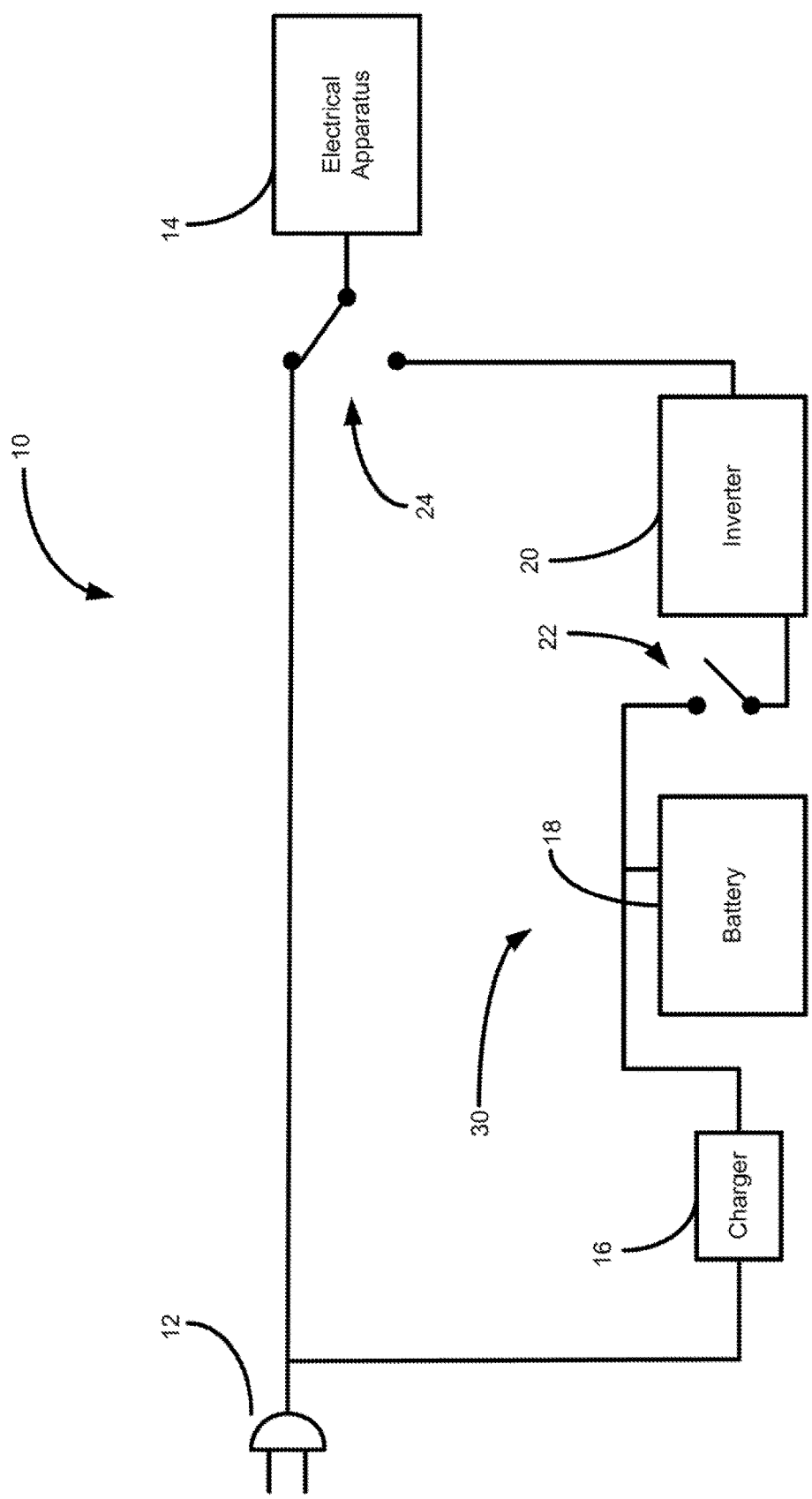
FIG. 1 is a simplified block diagram of an existing UPS unit providing AC power normally to an electrical apparatus.
Figure 2:
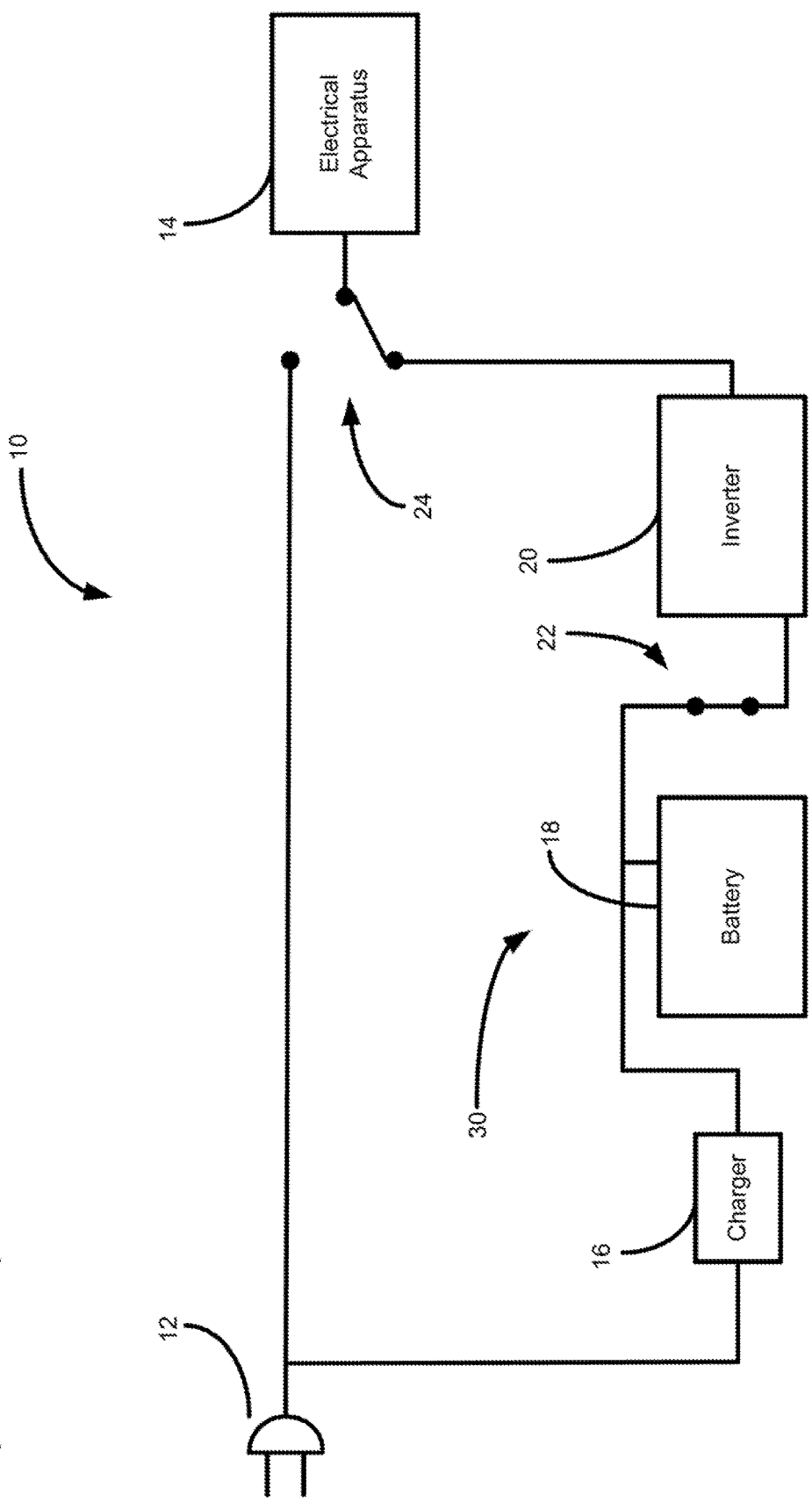
FIG. 2 is a simplified block diagram of the existing UPS unit of FIG. 1 during a power loss or disruption of acceptable power to the electrical apparatus.
Figure 3:
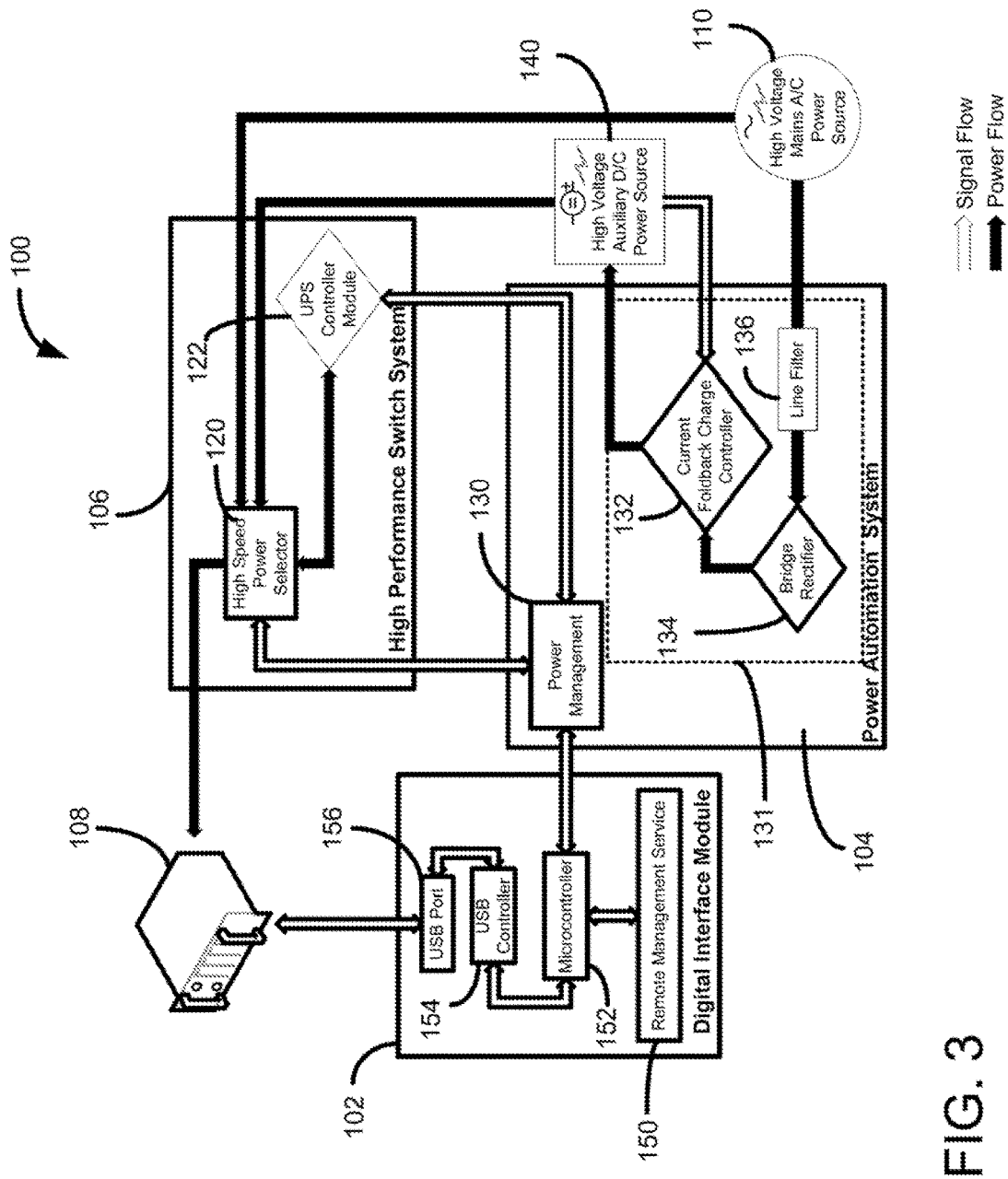
FIG. 3 is a simplified block diagram of an UPS unit according to the teachings of the present invention.

The present invention is an uninterruptible power supply unit 100 for an electrical apparatus. FIG. 3 is a simplified block diagram of the UPS unit 100 according to the teachings of the present invention. The UPS unit 100 includes a digital interface module 102, a power automation system 104, and a high performance switch system 106 for powering an electrical apparatus 108 by a power source, such as an AC power source 110 (e.g., from the grid or other source). The high performance switch system 106 includes a high speed power selector 120 and a UPS controller module 122. The power automation system 104 includes a power management module 130, a charging system 131 comprising a current foldback charge controller 132, a bridge rectifier 134, and a line filter 136. The power automation system receives power from a primary AC power source 110 or a secondary DC power source 140 (e.g., battery or battery bank). The digital interface module 102 includes a remote management service module 150, a microcontroller 152, a Universal Serial Bus (USB) controller 154, and a USB port 156. The DC power source may be any a DC power module, such as a rechargeable battery or battery bank, preferably providing DC power at approximately the same voltage as the AC power. Preferably, the battery or battery bank is sized to the electrical apparatus rating as well as utilizing an appropriate UPS unit 100 for the specified electrical apparatus.

In most instances, the electrical apparatus 108 receives electrical power from the AC power source 110, such as from the grid. In specific instances, DC power is directly provided by the DC power source 140 to the electrical apparatus 108 without converting the DC power to AC power. The high speed power selector 120 provides a quick response relay toggle capability to select the power source between the AC power source 110 and the DC power source 140.

In regards to the high performance switch system 106, the UPS controller module 122 is a bi-directional driver as well as bi-directional feedback to manage the high speed power selector 120. The UPS controller module 122 controls the high speed power selector 120 and the selection of the source of power (i.e., AC or DC power). The UPS controller module receives commands from the power management module 130 for switching between the AC power source and the DC power source as configured via a software tool. The high speed power selector 120 provides monitoring feedback to the power management module 130 on the AC and DC supply sources. Furthermore, the high speed power selector 120 acts on the drive from the UPS controller module and enables uninterruptible power output of the UPS unit 100.

Referring to the power automation system 104, the power management module 130 includes a processor and controls the overall functions of the UPS unit 100. The power management module 130 operates the UPS configuration maintained from the Digital Interface Module 102 (software managed) and monitors the UPS output from the high speed power selector 120. Additionally, the power management module enforces the decision based on the monitored UPS output to switch between AC and DC power. The power management module receives information from both the high speed power selector 120 and the UPS controller module 122 to determine when to switch between AC power and DC power. The charging system 131 is controlled by the power management module and provides charging to the second DC source 140. The line filter 136 is an input AC supply line conditioner. The bridge rectifier 134 provides full AC to DC conversion. The current foldback charge controller provides managed charging for the DC power source (e.g., battery or battery bank). The DC power source 140 receives power from the AC power source 110 to charge the DC power source. The DC power source is preferably a battery or battery bank providing approximately the same voltage (e.g., 110 volts) as the AC power source. Power is normally received from the AC power source 110 through the line filter 135, the bridge rectifier and the current foldback charge controller 132 and feed to the DC power source 140. Power from the AC power source can then be monitored and the DC power source properly charged. The power management module 130 receives information on the status of the DC power source (e.g., battery power at a low level).

The power management module 130 also communications with the digital interface module 102. The power management module preferably converts analog signals received from the high performance switch system 106 and power automation system 104 to digital signals for use by the digital interface module 102. The digital interface module 102 preferably operates using digital signaling with the electrical apparatus 108. The digital interface module provides a notification to the electrical apparatus 108, which may enable the electrical apparatus to autonomously perform a safe shutdown of the electrical apparatus 108 without loss of information. For example, if the electrical apparatus 108 is a computer operating a special program to communicate with the UPS 100, the digital interface module may command this special program to initiate a complete shutdown sequence, saving data to prevent loss of information to a safe power down of the computer 108 and the UPS 100. Additionally, the power automation system 104 may also issue a shutdown of the UPS 100 as the DC power source reaches a predetermined low power level. The Digital Interface Module 102 enables UPS software with plug-play configuration capabilities through the USB port 156. The USB controller 154 manages the USB port interface. The microcontroller 152 manages the interface between digital (i.e., digital Interface module 102) and analog (i.e., Power automation system 104) integration. The remote management services establish capabilities to manage the UPS unit 100 over a network terminal as well as establish Simple Network Management Protocol (SNMP) based management services or other protocol for managing devices on a network. The USB port 156 and USB controller 154 may be used for providing an interface with the electrical apparatus 108 and is standard in most interfaces with electrical devices.

With reference to FIG. 3, the operation of the UPS unit 100 will now be explained. Normally, the AC power source 110 provides power through the high speed power selector 120 to the electrical apparatus 108. Additionally, the AC power source 110 provides AC power to charge the DC power source 140. The AC power is conditioned through the line filter 136, converted to DC power by the bridge rectifier 134 and processed through the current foldback charge controller 132. The current foldback charge controller controls the receipt of power from the AC power source to the DC power source. The current foldback charge controller 132 senses the current and voltage and foldbacks the power if the current and voltage is not within predetermined levels. Thus, the DC power source 140 is safely charged. Furthermore, the power level of the DC power source is monitored by the power management module 130.

The high speed power selector 120 continuously monitors the AC power source 110 and provides this information to the power management module 130. When it is determined that power from the AC power source 110 is not within an acceptable level, the power management module 130 commands the UPS controller module 122 to switch power from the AC power source 110 to the DC power source 140. The switch from AC power to DC power is preferably accomplished at a sufficiently fast enough rate as to continually power the electrical apparatus 108 without inadvertently shutting off the electrical apparatus or the loss of data. The high speed power selector 120 then switches the power source from the AC power source 110 to the DC power source 140. Thus, when AC power is lost or at an unacceptable level, the DC power source provides sufficient power to operate the electrical apparatus 108. The high speed power selector 120 continues to monitor the AC power source 110 and when the power is acceptable from the AC power source, the power management module 130 may then command the UPS controller module to switch power back to the AC power source 110. In the present invention, DC power is supplied directly to the electrical apparatus without converting the DC power to AC power through an inverter.

In addition, throughout the time period when the DC power source 140 is providing power to the electrical apparatus 108, the power management 130 monitors the power level of the DC power source 140. When it is determined that the DC power source 140 is at a predetermined low power state, the power management module commands the digital interface module 102 to notify the electrical apparatus 108 of impending loss of power. The electrical apparatus may then autonomously commence a safe shutdown if configured in such a fashion to command a shutdown In a summary description of the components of the UPS unit 100, the UPS unit includes the power automation system 104, which is the main controller module that houses the power management module 130, the current foldback charge controller 132, the bridge rectifier 134, and the line filter 136. The AC power is passed through the line filter 136 to condition the supply voltage prior to passing it through the bridge rectifier 134, thereby converting this AC power to DC power for charging the DC power source 140 (e.g., battery bank). This clean filter DC power is used as a source by the foldback charge controller 132 to charge the DC power source 140. The power management 130 manages the switchover control decision driven from the feedback of the high speed power selector 120 and the UPS controller module 122. Additionally, the power management 130 also receives configurable monitoring parameters through the digital interface module 102. The high performance switch system 106 consists of the UPS controller module 122 and the high speed power selector 120. The UPS controller module 122 is managed by the power management module 130, which drives the high speed power selector 120 to connect the AC power source or the DC power source. The high speed power selector 120 is the conduit that selects the power supply line, specifically AC or DC power to pass it through to the load.

Figure 4A:
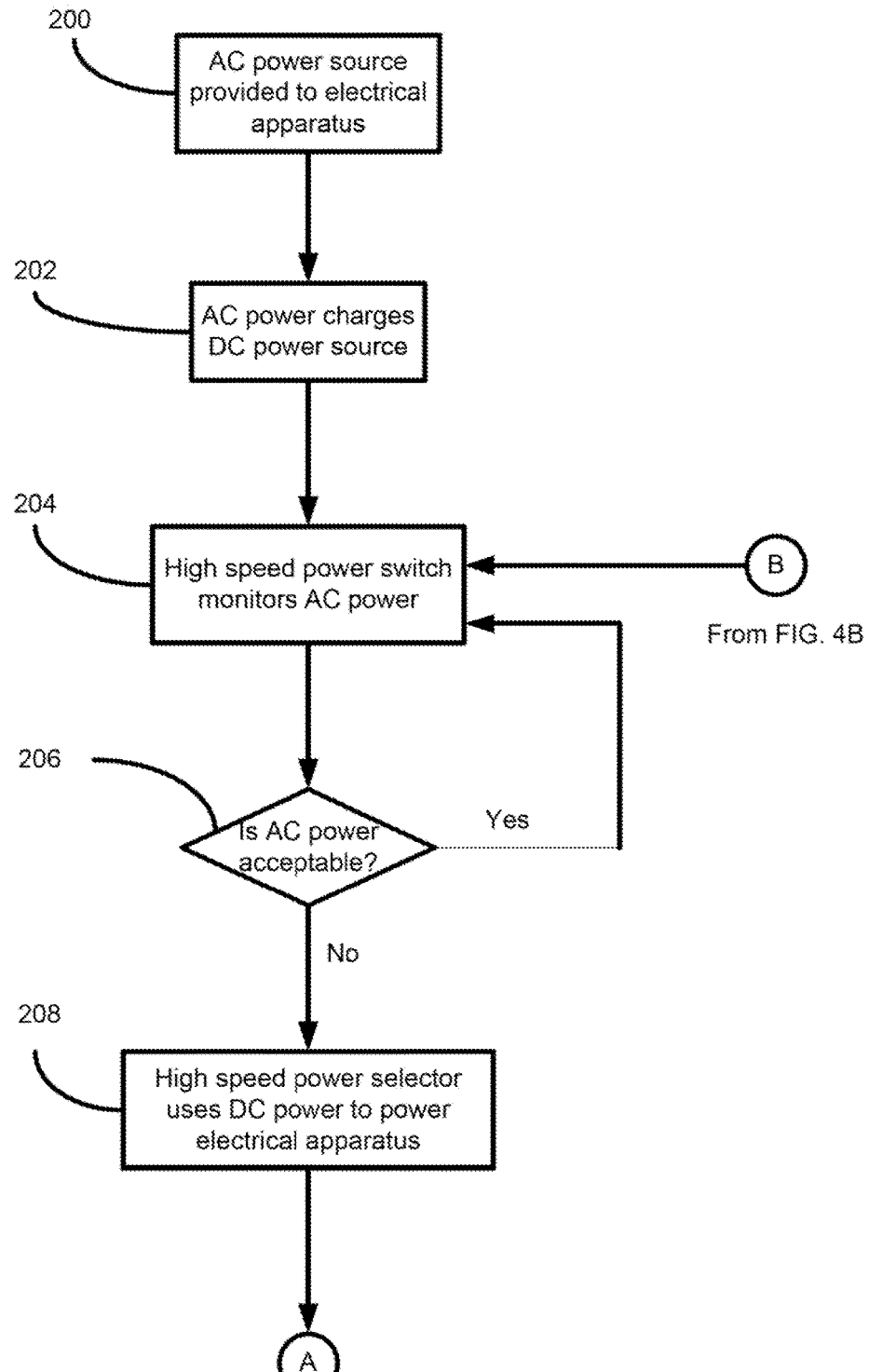
FIGS. 4A and 4B are flow charts illustrating the steps of operating the UPS unit according to the teachings of the present invention.
Figure 4B:
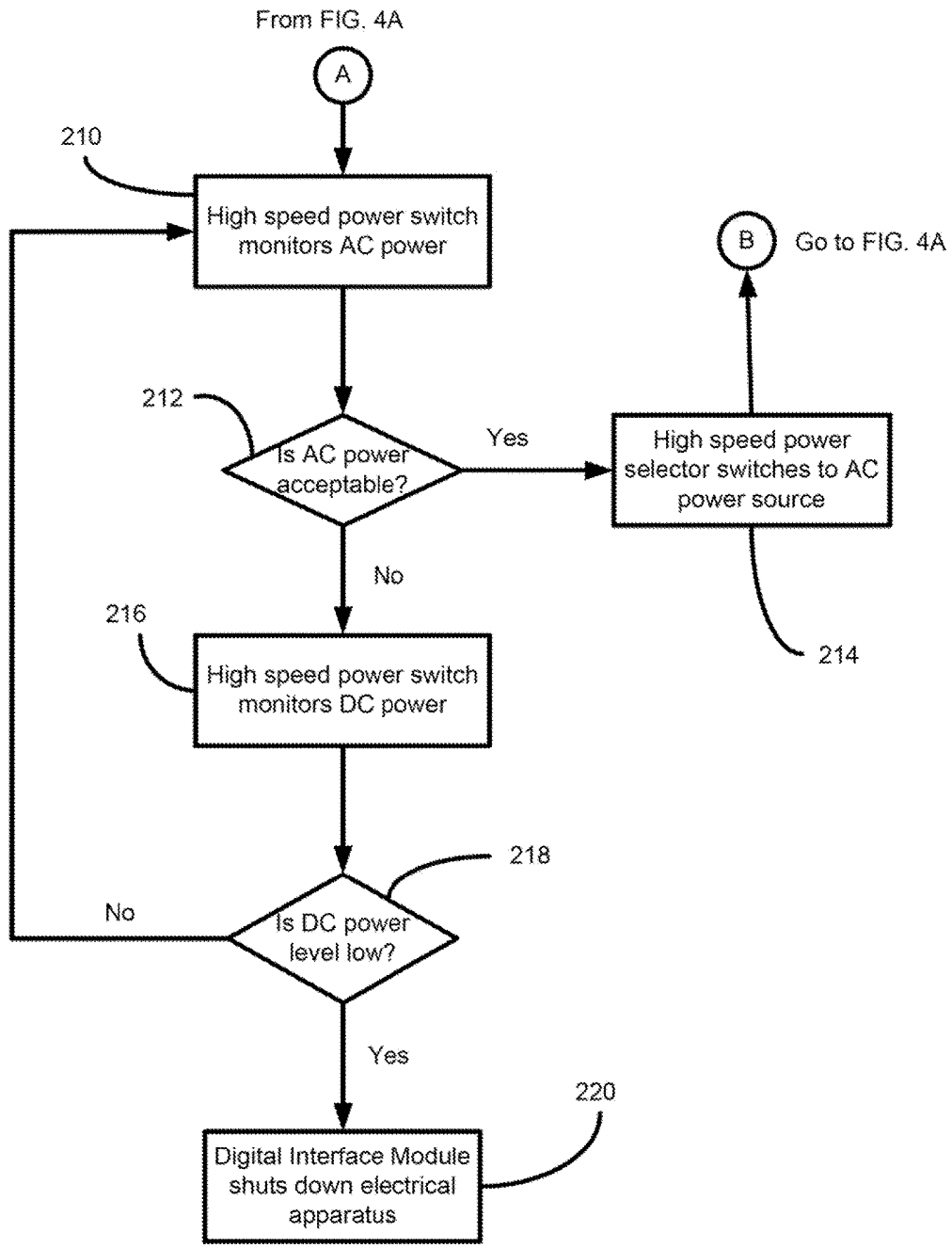

FIGS. 4A and 4B are flow charts illustrating the steps of operating the UPS unit 100 according to the teachings of the present invention. With reference to FIGS. 3, 4A, and 4B, the method will now be explained. The method begins with step 200 where the AC power source 110 provides power through the high speed power selector 120 to the electrical apparatus 108. In step 202, the AC power source 110 provides AC power to charge the DC power source 140. The AC power may be conditioned through the line filter 136, converted to DC power by the bridge rectifier 134 and processed through the current foldback charge controller 132. The current foldback charge controller controls the receipt of power from the AC power source to the DC power source. The current foldback charge controller 132 senses the current and voltage and foldbacks the power if the current and voltage are not within predetermined levels.

Next, in step 204, the high speed power selector 120 continuously monitors the AC power source 110 and provides this information to the power management 130. In step 206, it is determined if power from the AC power source 110 is within an acceptable level. If the power is determined to be at an acceptable level, the method moves to step 204 where the high speed power selector 120 monitors the power from the AC power source 110. However, in step 206, if it is determined that the power is not acceptable (i.e., loss of power or unacceptable power level, current, etc.), the method moves to step 208 where the power management module 130 commands the UPS controller module 122 to switch power from the AC power source 110 to the DC power source 140. The switch from AC power to DC power is preferably accomplished at a sufficiently fast enough rate as to continually power the electrical apparatus 108 without inadvertently shutting down the electrical apparatus or losing data. The high speed power selector 120 then switches the power source from the AC power source 110 to the DC power source 140. Thus, when AC power is lost or at an unacceptable level, the DC power source provides sufficient power to operate the electrical apparatus 108. In the present invention, the DC power is supplied directly to the electrical apparatus without converting the DC power to AC power. Next, in step 210, the high speed power selector 120 continues to monitor the AC power source 110. In step 212, it is determined if the power is acceptable from the AC power source. If it is determined that the AC power is acceptable, the method moves to step 214 where the power management module 130 may then command the UPS controller module to switch power back to the AC power source 110. The method then moves to step 204 where the power from the AC power source is monitored.

However, if in step 212 it is determined that power continues to be unacceptable from the AC power source, the method moves to step 216 where the power management 130 monitors the power level of the DC power source 140. In step 218, it is determined if the DC power source 140 is a predetermined low power state. If it is determined that the DC power source is below a predetermined low power state, the method moves to step 220 where power management module commands the digital interface module 102 to safely shutdown the electrical apparatus 108, thereby preventing damage to the electrical apparatus 108 and reduce or eliminate any loss of data. When the digital interface module 102 receives the command to shutdown the electrical apparatus 108, the microcontroller 152, through the USB 154 and the USB port 156, commands the electrical apparatus to shutdown prior to loss of all DC power. However, in step 218, if it determined that the DC power source is above the predetermined power level, the method moves to step 210 where the high speed power switch 120 continues to monitors the AC power source.

Although the present invention depict several components in a specific manner, it should be understood that the present invention may be in any configuration which utilizes a high speed power switch, a digital interface module, and a charging system for charging a DC power source which may directly power an electrical device without converting the DC power to AC power.

The present invention provides an uninterruptible power supply which does not require a step up or conversion of DC power to AC power during AC power outages. Because the present invention provides secondary power supply directly from the DC power source, the footprint of the UPS unit 100 is significantly smaller than conventional existing UPS units. Additionally, the present invention generates far less heat than conventional UPS units because power is obtained directly from the DC power source without converting the power to AC power. The present invention resolves many of the problems of existing UPS units in a relatively simple design. The present invention operates with little or no noise, provides direct current with no power conversion. Furthermore, the present invention does not require a fan or an inverter transformer.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An uninterruptible power supply system for supplying electrical power to an electrical apparatus, the system comprising:
    an alternating current (AC) power source providing AC power;
    a direct current (DC) power source providing DC power;
    a power selector system having a power selector for selecting AC power or DC power for powering the electrical apparatus, the power selector system having a sensor for determining if AC power is acceptable for powering the electrical apparatus;
    wherein the power selector system receives the AC power and the DC power and delivers either AC power or DC power directly to the electrical apparatus through a single shared connection for either AC or DC power to the electrical apparatus without using separate AC and DC lines leading to the electrical apparatus;
    a power automation system for charging the DC power source; and
    a power management module for controlling the power selector system and the power automation system, wherein the power management module commands the power system to immediately switch to DC power for powering the electrical apparatus when the AC power is unacceptable;
    wherein DC power is provided directly to the electrical apparatus when AC power is unacceptable without converting the DC power.

2. The uninterruptible power supply system according to claim 1 further comprising a digital interface module for automatically shutting down the electrical apparatus when a sensed DC power level is below a predetermined level.

3. The uninterruptible power supply system according to claim 2 wherein the power management module communicates with the digital interface module by converting analog signaling to digital signaling.

4. The uninterruptible power supply system according to claim 2 wherein the power automation system senses the DC power level of the DC power source.

5. The uninterruptible power supply system according to claim 2 wherein the digital interface module includes a USB port, a USB controller and a microcontroller.

6. The uninterruptible power supply system according to claim 2 wherein the digital interface module includes a remote management service module allowing remote service of the digital interface module from a remote location.

7. The uninterruptible power supply system according to claim 1 wherein the DC power source is a rechargeable battery.

8. The uninterruptible power supply system according to claim 1 wherein the DC power source provides DC power at a substantially equivalent voltage as the AC power.

9. The uninterruptible power supply system according to claim 1 wherein the power automation system receives AC power for charging the DC power source.

10. The uninterruptible power supply system according to claim 9 wherein the power automation system includes a line filter and a rectifier for converting AC power to DC power.

11. The uninterruptible power supply system according to claim 1 wherein the power selector system includes a controller module for controlling the power selector receiving commands from the power management module.

12. A method of providing uninterruptible power to an electrical apparatus, the method comprising the steps of:
    providing alternating current (AC) power from an AC power source to the electrical apparatus;
    monitoring the AC power to determine if the AC power is acceptable for powering the electrical apparatus; and
    upon determining that the AC power is not acceptable, immediately commanding a switch and switching from the AC power to direct current (DC) power from a DC power source, the DC power being directly fed to the electrical apparatus without converting the DC power to AC power by a power selector system which receives the AC power and the DC power and delivers either AC power or DC power directly to the electrical apparatus through a single shared connection for either AC or DC power to the electrical apparatus without using separate AC and DC lines leading to the electrical apparatus.

13. The method according to claim 12 further comprising the steps of:
    after the step of switching the AC power to DC power, monitoring the AC power to determine if the AC power is acceptable for powering the electrical apparatus; and
    upon determining that the AC power is acceptable for powering the electrical apparatus, reestablishing AC power to power the electrical apparatus.

14. The method according to claim 12 further comprising the step of charging the DC power source using AC power from the AC power source.

15. The method according to claim 12 further comprising the step of shutting down the electrical apparatus if a predetermined low power state is detected on the DC power source.

16. The method according to claim 12 further comprising the step of remotely controlling the uninterruptible power supply from a remote location.

17. The method according to claim 12 wherein the DC power has substantially equivalent voltage as the AC power.

* * * * *